J. T. MACOMBER.
Hand Seed Planter.

No. 101,480. Patented April 5, 1870.

Witnesses:
Chas. Nida
Alex T. Roberts

Inventor:
J. T. Macomber
Per Munn & Co.
Attorneys.

United States Patent Office.

J. T. MACOMBER, OF GRAND ISLE, VERMONT.

Letters Patent No. 101,480, dated April 5, 1870.

IMPROVEMENT IN HAND SEED-PLANTER.

The Schedule referred to in these Letters Patent and making part of the same.

*To all whom it may concern*.

Be it known that I, J. T. MACOMBER, of Grand Isle, in the county of Grand Isle and State of Vermont, have invented a new and improved Hand Seed-Planter; and I do hereby declare that the following is a full, clear, and exact description thereof, which will enable others skilled in the art to made and use the same, reference being had to the accompanying drawings forming part of this specification, in which—

Similar letters of reference indicate corresponding parts.

Figure 1:
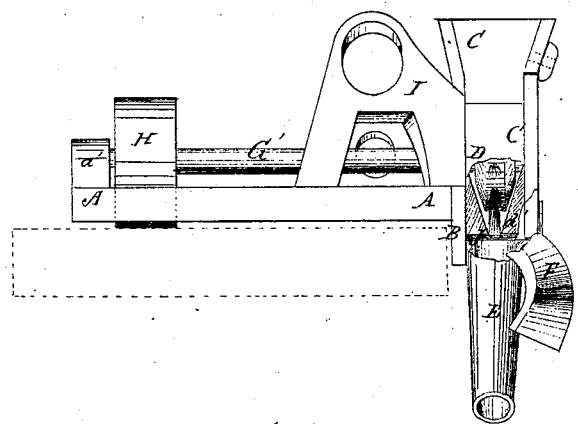
Figure 1 is a rear view of my improved hand seed-planter.
Figure 2:
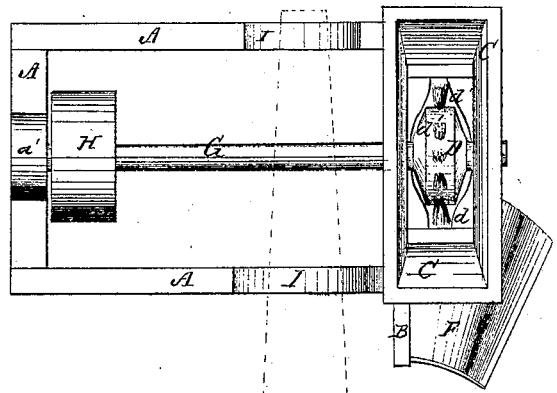
Figure 2 is a top or plan view of the same.
Figure 3:
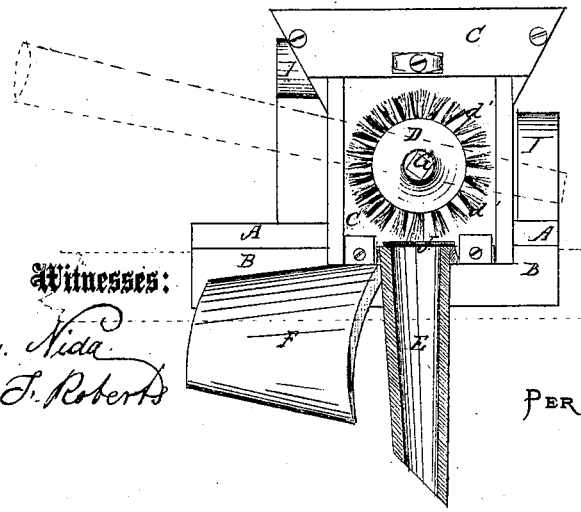
Figure 3 is an end view of the same, the side plate of the hopper being removed, and partly in section through the conductor-spout.

My invention has for its object to furnish a simple, convenient, and effective machine for planting garden-seed in drills or rows, with ease, dispatch, and accuracy; and It consists in the construction, combination, and arrangement of the various parts of the machine, as hereinafter more fully described.

A is the base-frame of the machine, to the end of which is attached a narrow downwardly-projecting guide-board, B.

To the same end of the frame A is attached the seed-hopper C, the lower part of which is so formed as to correspond somewhat in shape with the form of the dropping-wheel D.

To the face of the dropping-wheel D is attached a series of brushes, $d'$, by which the seed is brushed regularly and uniformly through the hole in the bottom of the hopper C, from which they pass through the conductor-spout E to the ground.

The lower end of the conductor-spout E is so formed as to open the ground to receive the seed, which seed is covered by the coverer F, attached to the rear part of the bottom of the hopper C, and so formed as to cover the seed evenly and smoothly.

The dropping-wheel D is attached to the shaft G, which passes through the lower part of the hopper C, and the other end of which revolves in a bearing, $a'$, attached to the other end of the base-frame A.

To the shaft G, near to its outer end, is attached a small wheel, H, to roll along the surface of the board or plank along which the machine is being moved, and thus revolve the dropping-wheel D $d'$.

I are two brackets attached to the base-frame A, and having holes formed in them in an inclined position to receive a handle, by means of which the machine is guided and propelled.

J is a slide sliding into a recess in the bottom of the hopper C, to prevent the escape of the seed when desired.

In using the machine, it is designed to be pushed along the surface of the board or plank, by means of which the distance apart of the drills is measured, the board or flange B being kept close up to the edge of the said board or plank, thus planting the drills evenly and regularly.

Having thus described my invention,

I claim as new and desire to secure by Letters Patent—

An improved hand seed-planting machine, formed by the combination of the base-frame A, guide-board or flange B, hopper C, dropping-wheel D $d'$, conductor and drilling-spout E, covererer F, shaft G, and wheel H, with each other, said parts being constructed, arranged, and operating substantially as herein shown and described, and for the purpose set forth.

The above specification of my invention signed by me this 6th day of December, 1869.

J. T. MACOMBER.

Witnesses:
    H. G. MACOMBER,
    SAMUEL MACOMBER.